United States Patent [19]

Barnet

[11] Patent Number: 4,949,235

[45] Date of Patent: Aug. 14, 1990

[54] MAGNETIC AMPLIFIER SHUTDOWN CIRCUIT

[75] Inventor: Robert A. Barnet, Howell, N.J.

[73] Assignee: Sundstrand Corporation, Rockford, Ill.

[21] Appl. No.: 439,683

[22] Filed: Nov. 21, 1989

[51] Int. Cl.$^5$ .............................................. H02M 7/06
[52] U.S. Cl. ...................................... 363/92; 323/254; 363/53; 363/82
[58] Field of Search .................. 323/249, 254; 363/52, 363/53, 82, 91, 92, 126

[56] References Cited

U.S. PATENT DOCUMENTS

| | | | |
|---|---|---|---|
| 3,084,322 | 4/1963 | Rhyne | 363/53 |
| 3,199,016 | 8/1965 | Greene et al. | 363/92 |
| 3,422,341 | 1/1969 | Kurimura et al. | 321/18 |
| 3,432,739 | 3/1969 | Kauffman | 363/92 |
| 3,564,196 | 2/1971 | Needham | 323/254 |
| 3,971,975 | 7/1976 | Genult | 321/18 |
| 4,159,514 | 6/1979 | Kakalec | 363/53 |
| 4,212,054 | 7/1980 | Seki | 363/53 |
| 4,276,591 | 6/1981 | Quick | 363/92 |
| 4,375,077 | 2/1983 | Williams | 323/254 |
| 4,591,966 | 5/1986 | Smith | 363/91 |

Primary Examiner—Peter S. Wong
Assistant Examiner—Jeffrey Sterrett
Attorney, Agent, or Firm—Antonelli, Terry, Stout & Kraus

[57] ABSTRACT

A power supply (100) for producing a regulated output DC voltage from an AC voltage source (12) having at least one phase (14); a fullwave rectifier (16) coupled to the AC voltage source for producing a rectified output voltage potential, the fullwave rectifier having a number of pairs of diodes (D1-D6) equal to a number of phases of the AC voltage source; a number of pairs of magnetic amplifiers S1-S6 equal to a number of phases of the AC voltage source, each magnetic amplifier having a control input for varying an impedance between an input and an output in response to variation of a control signal; a control (36), responsive to the output voltage, for producing the control signal in response to the output voltage to cancel any variation in the output voltage from a regulated voltage; a fault detection circuit, responsive to an electrical load drawing current from the power supply for producing a shutdown signal; and a circuit, coupled to one of the magnetic amplifiers of each of the phases, responsive to the shutdown signal, for conducting current to the AC voltage source in response to the shutdown signal.

28 Claims, 2 Drawing Sheets

MAGNETIC AMPLIFIER SHUTDOWN CIRCUIT

TECHNICAL FIELD

The present invention relates to power supplies producing a DC regulated output voltage by rectifying an AC input voltage with magnetic amplifiers used for voltage regulation.

BACKGROUND ART

FIG. 1 illustrates a prior art power supply 10 for producing a regulated output voltage from an AC voltage source 12 containing a plurality of phases 14 which may be of variable voltage and/or variable frequency. A fullwave rectifier 16 comprised of diodes D1–D6 is connected to the outputs 18 of the individual phases 14. A first group D1–D3 of the diodes passes positive pulses outputted from the phases 14 to a positive output terminal 20. A second group D4–D6 of diodes passes negative pulses from the phases 14 to a negative output terminal 22. The pulsating current produced by the diodes D1–D3 is filtered by filter 24 which is comprised of inductor 26 and capacitor 28 in a conventional manner to produce a DC output voltage across terminals 20 and 22 which is substantially ripple free. Resistor 29 represents an electrical load applied to the output with it being understood that the load may also include capacitance/or inductance and be variable.

The output voltage across terminals 20 and 22 is regulated by a voltage regulator 30 which is comprised of a plurality of magnetic amplifiers S1–S6 (saturable reactors), which respectively have first and second terminals which connect a main winding 32 in series between the output 18 of one of the phases 14 and one of the diodes D1–D6, a control winding 34 which conducts control current through each of the magnetic amplifiers S1–S6 which is proportional to the output voltage across terminals 20 and 22 and a control circuit 36. As is known, a magnetic amplifier functions as a variable impedance which switches from a high impedance to a low impedance after elapse of a time interval proportional to the control current and the volt-second product across the magnetic amplifier. Accordingly, as the current increases in the control winding of a magnetic amplifier, the time interval required for the impedance to switch from a high level to a low level increases. The control current 36 comprises a current amplifier which controls the current flowing in the common control winding 34 in direct proportion to the magnitude of the voltage at point 24. The point 24 is connected to the control input of the amplifier in the control circuit. Output voltage regulation across points 20 and 22 is insured as a consequence of any change in voltage producing an opposing change in current in the control winding 34. Thus an increase in output voltage causes the control current in winding 34 to increase which increases the time required to change the impedance of the magnetic amplifier from high to low. This time delay decreases the time out of a possible 180° of the rectified voltage during which the fullwave rectifier will conduct to cause a decrease in output voltage. A drop in output voltage produces the opposite effect. Capacitor 38 shunts harmonics from the control current applied to the magnetic amplifiers S1–S6.

If there is a fault in the control circuit 36, the control current applied to the individual magnetic amplifiers S1–S6 can go to zero to cause the time required for the magnetic amplifiers S1–S6 to drop to a minimum value which will cause the output voltage between terminals 20 and 22 to rise to maximum level that can result in damage to the electrical load 29 coupled thereto. Additionally, if an open circuit exists across the terminals 30 and 34, there will be a decrease in current in the control windings 34 of the individual magnetic amplifiers S1–S6 which can lead to damage of a load coupled to the output terminals 20 and 22 as a consequence of the fullwave rectifier 16 outputting maximum power.

Magnetic amplifiers are also known as saturable reactors or transductors. Publications on magnetic amplifiers are "The Magnetic Amplifier" by J.H. Reyner, 1950, "Transductor and Magnetic Amplifiers" by A.G. Milnes, 1957, and "Magnetic Amplifiers" by H.F. Storm, 1955. Magnetic amplifiers were used widely for high power switching applications until approximately 1970. Thereafter, silicon power devices supplanted many usages of magnetic amplifiers. Recently, developmental work has occurred with magnetic amplifiers for applications involving high frequency. U.S. Pat. Nos. 3,422,341, 3,971,975, 4,212,054 and 4,591,966 disclose reactors in series with diodes for outputting rectified current.

DISCLOSURE OF INVENTION

The present invention provides an improved DC power supply using magnetic amplifiers for providing voltage regulation which overcomes the disadvantages of the prior art discussed above with respect to FIG. 1. The present invention provides for control of the output voltage of the DC power supply in the event of a voltage or current fault in the load being driven. Furthermore, the circuit has the advantage that power for controlling the shutdown of a plurality of magnetic amplifiers contained in the DC power supply is derived from the input which protects the output in the event of a short circuit in the electrical load to prevent damaging of the load. The invention reverse biases the magnetic field of a magnetic amplifier associated with each phase of a fullwave rectification circuit contained in the power supply, from its normal forward orientation, in response to the generation of a shutdown signal indicative of a voltage or current fault. The reverse biasing of the magnetic field of the magnetic amplifiers is produced during a half of a cycle of the AC voltage preceding another half of a cycle of the AC voltage during which rectification occurs by activating a shunt circuit in response to the shutdown signal which causes a magnetizing current to flow from the AC power source in a second direction in reverse to normal current flow in the first direction through the magnetic amplifiers connected to the shunt circuit during rectification. As a result of the reverse biasing of the magnetic field of the magnetic amplifiers by current flow in the second direction, the first direction of current flow through the magnetic amplifiers is never of a sufficient magnitude to lower the impedance of the magnetic amplifiers in the fullwave rectification circuit to a point to permit high current flow. As a result, the output load cannot be damaged.

A power supply for producing a regulated output DC voltage from an AC input voltage in accordance with the invention includes an AC voltage source having at least one phase; a fullwave rectifier coupled to the at least one phase of the AC voltage source for producing a rectified output voltage, the fullwave rectifier having a number of pairs of diodes equal to a number of phases of the AC voltage source which are respectively connected to each of the phases with a first diode of each pair of diodes of a phase passing current having a first polarity to a first output and a second diode of each pair of diodes of the phase passing current of a second polarity to a second output; a number of pairs of magnetic amplifiers equal to a number of phases of the AC voltage source, each magnetic amplifier having a control input for varying an impedance between an input and an output in response to variation of a control signal, with a first magnetic amplifier each pair of magnetic amplifiers of a phase being coupled to the first diode of the phase and a second magnetic amplifier of each phase being coupled to the second diode of the phase, current flowing through the magnetic amplifiers in a first direction during rectification by the rectifier; a control circuit, responsive to the output voltage, for producing the control signal with the control signal varying in proportion to the output voltage to cancel any variation in the output voltage from a regulated voltage; a fault detection circuit, responsive to an electrical load drawing current from the power supply for detecting a fault condition, for producing a shutdown signal; and a circuit, coupled to one of the magnetic amplifiers of each of the phases, responsive to the shutdown signal, for conducting current to the AC voltage source in response to the shutdown signal to cause current flow from the AC source through the magnetic amplifiers coupled to the circuit in a second direction opposite to current flow through the magnetic amplifiers in the first direction. The circuit for conducting comprises a number of shunt diodes, equal to the number of phases, with each shunt diode being coupled to a magnetic amplifier and being conductive in response to current flow through the magnetic amplifier to the AC voltage source; a switch having control, first, and second terminals, the first terminal of the switch being coupled to each shunt diode and the second terminal of the switch being coupled to the AC voltage source and the control terminal being coupled to the shutdown signal and causing the switch to be conductive between the first and second terminals in response to the shutdown signal. Furthermore, a diode is connected between the second terminal of the switch and the AC voltage source, and a resistance is coupled to current flow in the circuit for conducting and the diode connected between the second terminal of the switch and the AC voltage source, the shunt diodes, the switch and the resistance controlling a magnitude of current flow through the magnetic amplifiers in the second direction. The AC voltage source may have a variable frequency and/or variable magnitude. Furthermore, a second switch is provided having control, first, and second terminals, the first terminal being coupled to one of the outputs, the second terminal being coupled to the control terminal of the first switch and the control terminal of the second switch being coupled to the shutdown signal. The switches are preferably transistors. The current flow in the second direction through the magnetic amplifier coupled to the circuit for conducting occurs during one half of a cycle of the AC voltage coupled to the magnetic amplifier and the current flow through the magnetic amplifier during rectification occurs during another half of a cycle of the AC voltage.

A protection circuit for a DC power supply in accordance with the invention includes an input AC voltage source having at least one phase; a fullwave rectifier coupled to the AC voltage source for producing a DC output voltage on an output from the AC voltage; a magnetic amplifier, coupled between each phase of the AC voltage source and the output of the fullwave rectifier, for controlling current flowing through the magnetic amplifier in a first direction within the rectifier in response to a control current produced by a control circuit coupled to the output, the control circuit regulating the DC output voltage; and a current limiting circuit coupled to the magnetic amplifier and to the AC voltage source, the current limiting circuit in response to a sensed fault in an electrical load coupled to the output causing current flow through the magnetic amplifier in a second direction, opposite to the first direction, to reverse bias a magnetic field in the magnetic amplifier from a bias of the magnetic field during flow of current through the rectifier in the first direction. Each phase of the AC voltage source is coupled to two magnetic amplifiers. The current limiting circuit causes a magnitude of current flow in the second direction which prevents current flow through each magnetic amplifier, which has been reversed biased, from producing a reduced impedance to current flow in the first direction. The current flow in the first direction through the magnetic amplifier occurs during one half of a cycle of the AC voltage coupled to the magnetic amplifier and the current flow in the second direction through the magnetic amplifier occurs during another half of a cycle of the AC voltage coupled to the magnetic amplifier.

A circuit for shutting down a magnetic amplifier coupled to a diode to limit current flow from an AC source in a first direction through the magnetic amplifier and the diode in accordance with the invention includes a circuit for generating a shutdown signal to cause shutdown of the magnetic amplifier; and a circuit, coupled between the magnetic amplifier and the AC source, responsive to the shutdown signal, to cause current to flow from the AC source through the magnetic amplifier in a second direction, opposite to the first direction, to the AC source to bias a magnetic field in the magnetic amplifier in a direction opposite to the magnetic field of the magnetic amplifier during current flow in the first direction. The magnitude of current flow in the second direction is sufficient to prevent the magnetic amplifier from assuming a reduced impedance during current flow in the first direction. The current flow in the first direction through the magnetic amplifier occurs during one half of a cycle of the AC voltage coupled to the magnetic amplifier and the current flow in the second direction through the magnetic amplifier occurs during another half of a cycle of the AC voltage coupled to the magnetic amplifier.

BEST MODE FOR CARRYING OUT THE INVENTION

Figure 2:
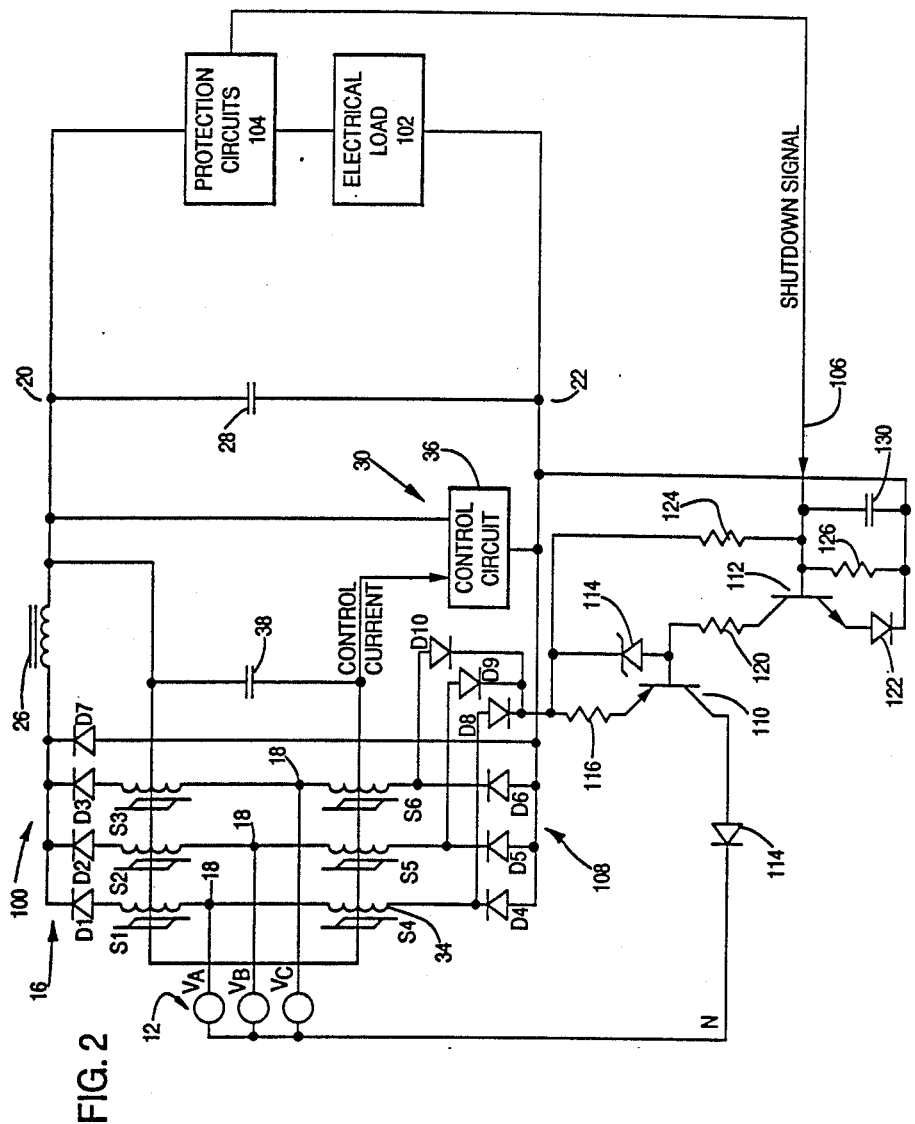
FIG. 2 illustrates a DC power supply using magnetic amplifiers in accordance with the present invention.

FIG. 2 illustrates an embodiment 100 of a DC power supply in accordance with the present invention utilizing magnetic amplifiers. The DC power supply of the present invention may be used for driving loads which draw high currents in excess of 100 amperes. In accordance with the invention, the presence of a fault condition, which may be either a voltage or current fault in an electrical load being driven by the DC power supply, is sensed to produce a SHUTDOWN SIGNAL. The SHUTDOWN SIGNAL is used to cause current to flow from an AC voltage source through a group of magnetic amplifiers which are respectively coupled to different phases of an AC voltage source in a second direction opposite to a first direction of current flow through the magnetic amplifiers during normal operation in which current is rectified by a fullwave rectifier in the power supply. The current flows in the first and second directions respectively occur during different halves of a cycle of an AC voltage coupled to the magnetic amplifier.

Figure 1:
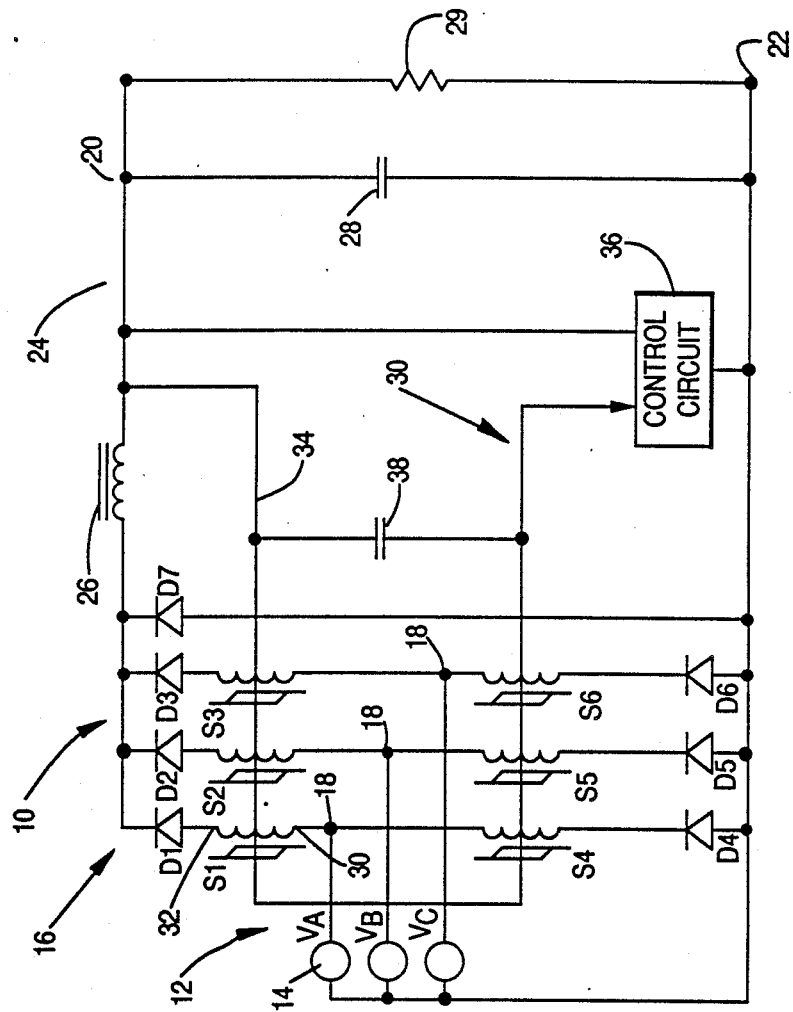
FIG. 1 illustrates a prior art DC power supply utilizing magnetic amplifiers.

Current flow in the second direction reverse biases the magnetic field in the magnetic amplifiers through which the current flows such that the normal forward flow of current in the first direction during rectification by the rectifier 16 does not change the magnetic amplifier to a low impedance condition which limits the output voltage that effectively prevents damaging of the electrical load during faults. The power required to reverse bias the magnetic amplifiers during a fault is provided by the AC input to the power supply which prevents a short circuit in the load from disabling the control circuit 36. Furthermore, a fault in the control circuit 36 does not disable the regulation circuit 30 as a consequence of the reverse biasing of the magnetic amplifiers being independent of the control circuit. Parts which function in the same manner in FIGS. 1 and 2 will not be discussed in conjunction with FIG. 2 except to the extent necessary to understand the present invention.

The output terminals 20 and 22 are connected to an electrical load 102, which may be of any nature, and one or more protection circuits 104 which may be of a conventional design that function to sense the presence of either a voltage or a current fault condition in the electrical load. Upon sensing a current or voltage fault in the electrical load 102, a SHUTDOWN SIGNAL is generated on output 106 of the protection circuits 104. A circuit 108 functions to conduct current in the second direction flowing from the points 18 through a magnetic amplifier coupled thereto to the neutral N of the AC voltage source 12. It should be understood that the circuit 108 may be coupled to either of the groups of diodes D1-D3 or D1-D6. Preferably, the circuit 108 is coupled to one of the groups of diodes D1-D3 or D4-D6. The circuit 108 is comprised of shunt diodes D8-D100 having anodes which are respectively coupled to cathodes of diodes D4-D6 of the fullwave rectifier 16 which is connected to the output negative terminal 22. A pair of transistor switches 110 and 112 are connected as a two-stage amplifier which turns on in response to the SHUTDOWN SIGNAL to permit current flow in the second direction from points 18 through the magnetic amplifiers S4-S6 to reverse bias their magnetic fields associated with the individual phases of the AC voltage source 12 to the neutral N of the voltage source. Zener diode 114 provides overvoltage protection for the emitter to base junction of transistor 110. Transistor 110, resistor 116 and diode 118 limit the flow of current in the second direction through the magnetic amplifiers S4-S6 to the neutral N of the AC voltage source 12 to a level so as to only provide sufficient magnetization current to complete the reverse biasing of the magnetic field in the magnetic amplifiers. This current is on the order of milliamps. Diode 118 permits current to flow only from the outputs 18 of the phases to the neutral N. Resistor 120 limits the magnitude of the base drive applied to transistor 110 from the collector of transistor 112. Diode 122 limits the flow of current from the emitter of transistor 112 to the negative terminal 22. Resistors 124 and 126 and capacitor 130 function to provide a suitable bias to the base to emitter junction of transistor 112.

The operation of the embodiment 100 of FIG. 2 is as follows. In response to either a voltage or a current fault condition produced by the protection circuits 104, a SHUTDOWN SIGNAL is generated which causes the transistor 110 to switch into an "on" condition to permit current to flow from the terminals 18 through magnetic amplifiers S4-S6 in the second direction through shunt diodes D8-D1O to the neutral N of the AC voltage source 12. The flow of current in the second direction through the magnetic amplifiers (opposite to the direction when the rectifier 16 is operating) reverse biases the magnetic field of the magnetic amplifiers which prevents the flow of current in the first normal direction during which rectification occurs from converting the magnetic amplifiers to a low impedance. The high impedance condition of magnetic amplifiers S4-S6 during a half of the AC cycle during which rectification occurs limits the current which can flow from the output terminals 20 and 22 substantially below the high current output when all of the magnetic amplifiers S1-S6 are operational. Neither a short across the electrical load 102 or failure of the control circuit 36 disables the operation of the present invention.

While the invention has been described in terms of its preferred embodiment, it should be understood that numerous modifications may be made thereto without departing from the spirit and scope of the invention as defined in the appended claims. It is intended that all such modifications fall within the scope of the appended claims.

I claim:

1. A power supply for producing a regulated output DC voltage from an AC input voltage comprising:
   an AC voltage source having at least one phase;
   a fullwave rectifier coupled to the at least one phase of the AC voltage source for producing a rectified output voltage, the fullwave rectifier having a number of pairs of diodes equal to a number of phases of the AC voltage source which are respectively connected to each of the phases with a first diode of each pair of diodes of a phase passing current having a first polarity to a first output and a second diode of each pair of diodes of a phase passing current of a second polarity to a second output;
   a number of pairs of magnetic amplifiers equal to a number of phases of the AC voltage source, each magnetic amplifier having a control input for varying an impedance between an input and an output in response to variation of a control signal with the first magnetic amplifier of each pair of magnetic amplifiers of a phase being coupled to the first diode of the phase and the second magnetic amplifier of each phase being coupled to the second diode of the phase, current flowing through the magnetic amplifiers in a first direction during rectification by the rectifier;
   a control, responsive to the output voltage, for producing the control signal with the control signal varying in response to the output voltage to cancel any variation in the output voltage from the regulated voltage;

means, responsive to an electrical load drawing current from the power supply, for detecting a fault condition for producing a shutdown signal; and means, coupled to one of the magnetic amplifiers of each of the phases, responsive to the shutdown signal, for conducting current to the AC voltage source in response to the shutdown signal to cause current flow from the AC source through the magnetic amplifiers coupled to the means for conducting in a second direction opposite to the current flow through the magnetic amplifiers in the first direction.

2. A power supply in accordance with claim 1 wherein the means for conducting current comprises:

a number of shunt diodes, equal to the number of phases, with each shunt diode being coupled to a different magnetic amplifier and being conductive in response to current flow through the magnetic amplifier to the AC voltage source; and a switch having control, first, and second terminals, the first terminal of the switch being coupled to each shunt diode and a second terminal of the switch being coupled to the AC voltage source and the control terminal being coupled to the shutdown signal and causing the switch to be conductive between the first and second terminals in response to the shutdown signal.

3. A power supply in accordance with claim 2 further comprising:

a diode connected between the second terminal of the switch and the AC voltage source;

a resistance coupled to current flow in means for conducting current flow; and the diode connected between the second terminal of the switch and the AC voltage source, the shunt diodes, the switch and the resistance controlling a magnitude of current flow through the magnetic amplifiers in the second direction.

4. A power supply in accordance with claim 3 wherein:

the AC source has a variable voltage.

5. A power supply in accordance with claim 3 wherein:

the AC source has a variable frequency.

6. A power supply in accordance with claim 3 wherein:

the AC source has a variable voltage and frequency.

7. A power supply in accordance with claim 3 further comprising:

a second switch having control, first and second terminals, the first terminal being coupled to one of the outputs, the second terminal being coupled to the control terminal of the first switch and the control terminal of the second switch being coupled to the shutdown signal.

8. A power supply in accordance with claim 7 wherein:

the current flow in the first direction through the magnetic amplifier coupled to the means for conducting occurs during one half of a cycle of the AC voltage coupled to the magnetic amplifier and the current flow in the second direction through the magnetic amplifier occurs during another half of a cycle of the AC voltage.

9. A power supply in accordance with claim 7 wherein:

the switches are transistors.

10. A power supply in accordance with claim 3 wherein:

the current flow in the first direction through the magnetic amplifier coupled to the means for conducting occurs during one half of a cycle of the AC voltage coupled to the magnetic amplifier and the current flow in the second direction through the magnetic amplifier occurs during another half of a cycle of the AC voltage.

11. A power supply in accordance with claim 2 wherein:

the AC source has a variable voltage.

12. A power supply in accordance with claim 2 wherein:

the AC source has a variable frequency.

13. A power supply in accordance with claim 2 wherein:

the AC source has a variable voltage and frequency.

14. A power supply in accordance with claim 2 wherein:

the current flow in the first direction through the magnetic amplifier coupled to the means for conducting occurs during one half of a cycle of the AC voltage coupled to the magnetic amplifier and the current flow in the second direction through the magnetic amplifier occurs during another half of a cycle of the AC voltage.

15. A power supply in accordance with claim 1 wherein:

the current flow in the first direction through the magnetic amplifier coupled to the means for conducting occurs during one half of a cycle of the AC voltage coupled to the magnetic amplifier and the current flow in the second direction through the magnetic amplifier occurs during another half of a cycle of the AC voltage.

16. A power supply in accordance with claim 1 wherein:

the AC voltage source has a variable voltage.

17. A power supply in accordance with claim 16 wherein:

the current flow in the first direction through the magnetic amplifier coupled tot he means for conducting occurs during one half of a cycle of the AC voltage coupled tot he magnetic amplifier and the current flow in the second direction through the magnetic amplifier occurs during another half of a cycle of the AC voltage.

18. A power supply in accordance with claim 1 wherin:

the AC voltage soucre has a viariable in frequency.

19. A power supply in accordance with claim 18 wherein:

the current flow in the first direction through the magnetic amplifier coupled to the means for conducting occurs during open half of a cycle of the AC voltage coupled to the magnetic amplifier and the current flow in the second direction through the magnetic amplifier occurs during another half of a cycle of the AC voltage.

20. A power supply in accordance with claim 1 wherein:

the AC voltage source has a variable voltage and frequency.

21. A power supply in accordance with claim 20 wherein:

the current flow in the first direction through the magnetic amplifier coupled to the means for conducting occurs during one half of a cycle of the AC voltage coupled to the magnetic amplifier and the current flow in the second direction through the magnetic amplifier occurs during another half of a cycle of the AC voltage.

22. A protection circuit for a DC power supply comprising:
an AC input voltage source having at least one phase;
a fullwave rectifier coupled to the AC voltage source for producing a rectified DC voltage on a DC output from the aC voltage;
a magnetic amplifier, coupled between each phase of the AC voltage source and the output of the fullwave rectifier, for controlling current flowing through he magnetic amplifier in a first direction in the rectifier in response to a control current produced by a control circuit coupled to the output, the control circuit regulating the DC voltage; and
a current limiting circuit, coupled to the magnetic amplifier and to the AC voltage source, the current limiting circuit in response to a sensed fault in an electrical load coupled to the DC output causing current flow through the magnetic amplifier in a second direction, opposite to the first direction, to reverse bias a magnetic filed int he magnetic amplifier from a bias of the magnetic field during flow of current through the rectifier in the first direction.

23. A protection circuit in accordance with claim 22 wherein:
each phase of the AC voltage source is coupled to two magnetic amplifiers.

24. A protection circuit in accordance with claim 23 wherein:
the current limiting circuit causes a magnitude of current flow in the second direction which prevents current flow, through each magnetic amplifier which has been reverse biased, in the first direction producing a reduced impedance to current flow in the first direction.

25. A protection circuit in accordance with 10 claim 24 wherein:
the current flow in the first direction through the magnetic amplifier occurs during one half of a cycle of the AC voltage coupled to the magnetic amplifier and the current flow in the second direction through the magnetic amplifier occurs during another half of a cycle of the AC voltage coupled to the magnetic amplifier.

26. A circuit for shutting down a magnetic amplifier coupled to a diode to limit current flow from an AC source in a first direction through the magnetic amplifier and the diode comprising:
means for generating a shutdown signal to cause shutdown of the magnetic amplifier; and
means, coupled between the magnetic amplifier and the AC source, responsive to the shutdown signal, to cause current to flow from the AC source through the magnetic amplifier in a second direction, opposite the first direction, to the AC source to bias a magnetic field in the magnetic amplifier in a direction opposite to a magnetic field in the magnetic amplifier during current flow in the first direction.

27. A circuit in accordance with claim 26 wherein:
a magnitude of current flow in the second direction is sufficient to prevent the magnetic amplifier from assuming a reduced impedance during current flow in a first direction.

28. A circuit in accordance with claim 27 wherein:
the current flow in the first direction through the magnetic amplifier occurs during one half of a cycle of the AC voltage coupled to the magnetic amplifier and the current flow in the second direction through the magnetic amplifier occurs during another half of a cycle of the AC voltage coupled to the magnetic amplifier.

* * * * *